(No Model.)
E. THOMSON.
METHOD OF ELECTRIC RIVETING.
No. 396,015. Patented Jan. 8, 1889.
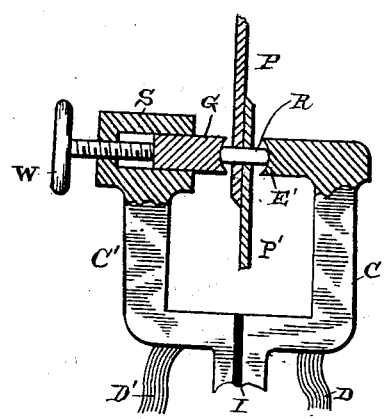
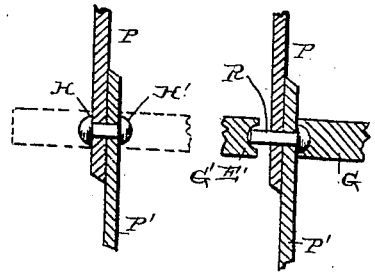
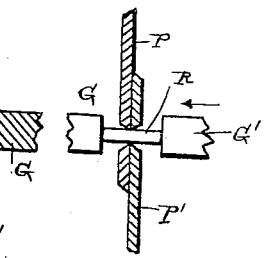
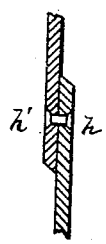
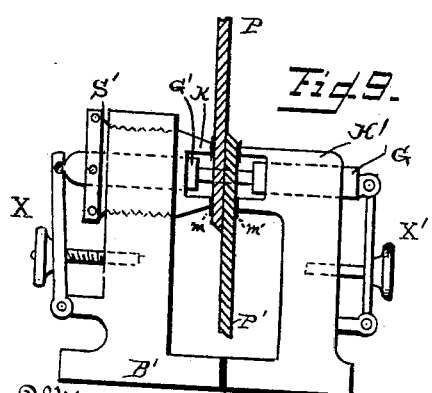
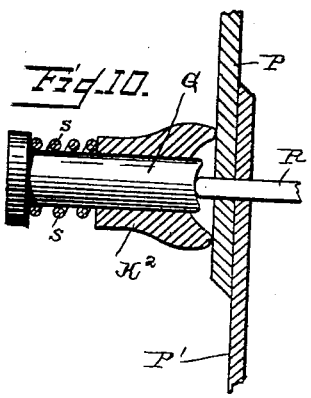
Witnesses.
Ira P. Steward
H. H. Capel
Inventor
Elihu Thomson
By his Attorney
H. C. Townsend

UNITED STATES PATENT OFFICE.

ELIHU THOMSON, OF LYNN, MASSACHUSETTS.

METHOD OF ELECTRIC RIVETING.

SPECIFICATION forming part of Letters Patent No. 396,015, dated January 8, 1889.

Application filed October 12, 1888. Serial No. 287,910. (No model.)

*To all whom it may concern:*

Be it known that I, ELIHU THOMSON, a citizen of the United States, and a resident of Lynn, in the county of Essex and State of Massachusetts, have invented a certain new and useful Improved Method of Electric Riveting, of which the following is a specification.

My invention consists, essentially, in a method of riveting by placing the rivet or rivet-blank in position in the socket or hole designed to receive it, passing through said rivet an electric current of sufficient volume to heat the same to the requisite temperature, and then setting the rivet in its position by endwise pressure or other means employed in ordinary riveting operations.

In carrying out my invention I may swage or form both heads after the heating of the rivet-blank in position in the work, or may swage or form one head only, the rivet having been inserted with one head ready formed. The heating of the rivet when in position may be carried only to the point sufficient to permit it to be set by swaging or heading its ends, or the current may be allowed to pass for a longer period and until the central portion of the rivet, as well as the metal near thereto, is raised to a welding temperature, when the application of pressure expanding the rivet in its seat will weld the same to the metal surrounding it, and the application of pressure to the pieces to be riveted will weld them together around the rivet. In some cases I may cause the electric current to flow across from piece to piece of the parts to be riveted, as well as through the rivet itself.

Detail processes forming a part of my invention will be more particularly specified in the claims.

In the accompanying drawings, forming a part of this specification, Figure 1 is a side elevation and partial section of a form of apparatus suitable for carrying out my method of electric riveting. Fig. 2 is a view of the rivet after the operation has been effected. Figs. 3 and 4 illustrate modifications in the manner of practicing the invention. Figs. 5, 6, 7, and 8 are illustrations of the work accomplished. Fig. 9 is a side elevation of an improved form of apparatus which may be used in practicing my present invention. Fig. 10 shows a further modification.

In Fig. 1, P P' indicate two plates of metal—such as boiler or sheet metal—to be secured together by means of a rivet placed in a hole passing through lapped portions of the plates.

C C' indicate two blocks or pieces of material adapted to conduct an electric current and made sufficiently massive to permit the current of large volume required in the operation to pass without becoming unduly heated.

The electric current required is conveyed from any source—such, for instance, as that described in my previous patent, No. 347,140— to the blocks C C' by means of cables D D', or by other means, and the blocks are insulated from one another, as indicated at I, in order to prevent the current of the cables from short-circuiting around the work. Supported upon the head S of the block C'', and in electrical connection therewith, is a plunger, G, whose end is of the nature of a swaging tool or die, and which may be forced against the work by means of a screw, W. Formed upon or attached to the block C, and in electrical connection with the source of current, is another receiving block or anvil, E', for one end of the rivet. The faces or ends of the blocks G E' are in line with one another, and are adapted to receive the rivet R between them. The contour of their swaging, forming, or holding ends may be considerably varied, according to the special manner of securing the rivet in place which it is desired to employ. In the form shown in Fig. 1 the end of G is made concave to receive and fit over the end of the rivet-blank and to operate as a means of swaging a head upon the rivet-blank. The other block, E', is similarly formed for a similar purpose.

In employing the apparatus described the blocks or pieces G E' are brought to bear upon the rivet or rivet-blank R, which has been previously inserted into the hole through the plates, the ends of said blocks receiving the ends of the rivet or rivet-blank between them. Electric current is now turned on and made to pass through the rivet or blank in sufficient volume to heat the rivet to a softened condition, after which endwise pressure or other force is applied through the plunger G—as, for instance, by means of screw W. This will firmly seat and expand the rivet in its hole, and will at the same time form heads at opposite ends of the rivet-blank, or at one end thereof only, if, as indicated in Fig. 3, a rivet with a head already formed has been inserted into the hole previously to the riveting operation.

Fig. 2 illustrates the condition of things at the completion of the operation, the rivet being there shown as set.

In Fig. 3 the rivet is shown as having one head formed on it before being inserted into the hole bored or punched for the purpose. The other head is formed at E' by the movement of the clamping piece or plunger G' after the current has heated the metal to the desired temperature.

Fig. 4 simply illustrates the fact that two plungers, G G', might be employed and moved in opposite directions or toward the rivet-blank R after the blank is sufficiently heated. This figure also shows that the holes punched or bored in the plates may be countersunk, so that the riveted heads may not protrude from the plates.

Fig. 5 shows two plates riveted in this manner, the rivet fitting solidly into the countersunk holes, as shown at $h\ h'$.

A valuable effect, (illustrated in Fig. 6,) not possible in other processes, may be obtained in my method of riveting by continuing the heating of the rivet-blank placed in the hole for some moments longer than is necessary to raise it to a softening temperature. By conduction the heat is carried to the portions of the plate surrounding the rivet, raising such portions to a welding temperature, and when the rivet is pushed firmly into the hole a partial welding of the rivet to the sides of the hole is effected, thus forming practically solid metal for a portion of the distance from $d$ to $d'$.

Fig. 7 shows a similar effect, which occurs when the rivet-heads are not forced into countersunk holes, but are allowed to protrude from the plates.

Fig. 8 shows a modification where one head of the rivet is allowed to protrude from the plate, the other end fitting solidly and evenly into the countersunk hole bored to receive it.

Fig. 9 shows a modified form of apparatus which is found useful in carrying out my improved method of electric riveting, and which is an improvement over that of Fig. 1, inasmuch as it can be used to force the plates together before the current is put on and keep them together while the rivet is heated and secured in place. K K' are heavy clamping-pieces having a common bed or support, B', and one or both provided with a screw, S'. By means of screw S' the clamping device K K' may be forced hard against the plates P P', as shown in the figure, thus making a firm contact where the metals are lapped over each other.

The plungers or formers G G' are mounted in the clamp-heads, and are operated by means of the screw-nuts X X' bearing upon levers connected to the plungers. By the use of this form of apparatus a heating electric current might be passed through the metal plates themselves at parts around the rivet, by means of the pressure pieces or clamps K K'. Such current would assist in raising the portion of the plates immediately surrounding the rivet to the welding temperature; but the prime object is that through the application of the pressure the plates themselves may be held together during the riveting. The blocks K' K may therefore be faced with mica or other insulator, $m\ m'$.

Fig. 10 shows a modification of the just-described apparatus. G is one of the plungers which is used to convey the current to the rivet R. $K^2$ is a heavy piece of metal, so arranged as to press against the plates P P'. Pressure is applied to piece $K^2$ from the plunger by the springs $s\ s$.

It will be seen that by my improved method of electric riveting a large amount of labor is overcome and much time is saved. The heating of the rivet can be accomplished in a very few seconds, the time depending on the power of the electric apparatus supplying the current. It is also obvious that the inconvenience of transporting hot rivets from the forge to the hole in the boiler or other plates is avoided in my present invention. The superior advantage, also, of partially welding the rivet to the plate is obvious.

I have described some of the forms of apparatus that may be used for carrying out my invention; but it will be readily understood that the same method might be practiced by using other devices.

While I have described the riveting of the blank after heating as being performed by means of the blocks through which current is applied to the rivet or blank, it is obvious that the invention might be practiced by withdrawing said blocks after the rivet has been heated to the desired degree, or by applying the current through any other means, and then heading the rivets by any desired means.

I have not herein claimed the apparatus described, as my present patent is for the novel art or process, whether practiced by means of the apparatus described or any other suitable apparatus.

What I claim as my invention is—

1. The herein-described improved method of riveting, consisting in heating the rivet or rivet-blank electrically while in place, and then heading either or both ends of the same.

2. The herein-described method or process of riveting, consisting in making the rivet while in position a portion of a circuit carrying a heating or large volume of electric current, and then setting the rivet by any desired means, as and for the purpose described.

3. The herein-described method of riveting, consisting in passing a heavy electric current through the rivet or rivet-blank while the same is in position, and then applying end-pressure to the rivet to set the same.

4. The herein-described method of riveting, consisting in applying to opposite ends of the rivet while in position suitable metal blocks or pieces, either or both movable, including said blocks and rivet in an electric circuit carrying an electric current of large volume for the purpose of heating the rivet, and then forcing said blocks or pieces toward one another to set the rivet.

5. The herein-described method of riveting, consisting in heating the rivet while in place by an electric current until it assumes a welding temperature, and then applying pressure to set the rivet in its seat and unite the sides of the same to the metal body through which it passes.

6. The herein-described method of fastening two pieces of metal together, consisting in passing a heating electric current through a rivet or rivet-blank, passing through the pieces as well as through the pieces of metal themselves in the neighborhood of the rivet, and applying pressure to set the rivet and weld the pieces together.

7. The herein-described method of electric riveting, consisting in pressing the plates together, heating the rivet inserted through the plates by a heavy electric current flowing through the same, and applying end-pressure to the rivet to head or set the same.

Signed at Lynn, in the county of Essex and State of Massachusetts, this 10th day of October, A. D. 1888.

ELIHU THOMSON.

Witnesses:
 CHARLES G. STONE,
 OTIS K. STUART.